(12) United States Patent
Bond et al.

(10) Patent No.: US 11,345,633 B2
(45) Date of Patent: May 31, 2022

(54) SEALING MATERIAL

(71) Applicant: Flexitallic Investments, Inc., Houston, TX (US)

(72) Inventors: Stephen Peter Bond, Houston, TX (US); Richard Rodgers, Cleckheaton (GB); Stephen Woolfenden, Lancashire (GB); Neal Skipper, London (GB)

(73) Assignee: Flexitallic Investments, Inc., Houston, TX (US)

( * ) Notice: Subject to any disclaimer, the term of this patent is extended or adjusted under 35 U.S.C. 154(b) by 952 days.

(21) Appl. No.: 15/575,790

(22) PCT Filed: May 19, 2016

(86) PCT No.: PCT/GB2016/051450
§ 371 (c)(1),
(2) Date: Nov. 20, 2017

(87) PCT Pub. No.: WO2016/185220
PCT Pub. Date: Nov. 24, 2016

(65) Prior Publication Data
US 2018/0141860 A1 May 24, 2018

(30) Foreign Application Priority Data

May 20, 2015 (GB) .................................. 1508628.3
Jun. 3, 2015 (GB) .................................. 1509650.6
Apr. 14, 2016 (GB) .................................. 1606561.7

(51) Int. Cl.
*C04B 14/20* (2006.01)
*C04B 30/00* (2006.01)
*C04B 111/27* (2006.01)

(52) U.S. Cl.
CPC ............ *C04B 14/206* (2013.01); *C04B 30/00* (2013.01); *C04B 2111/27* (2013.01)

(58) Field of Classification Search
CPC .... C04B 14/206; C04B 2111/27; C04B 30/00
See application file for complete search history.

(56) References Cited

U.S. PATENT DOCUMENTS

| 4,497,869 A | 2/1985 | Kamigaito et al. |
| 4,818,435 A | 4/1989 | Lukacs, III |
| 4,877,551 A | 10/1989 | Lukacs, III |
| 4,885,330 A * | 12/1989 | Brungardt ............. C04B 14/208 524/447 |
| 4,915,871 A | 4/1990 | Atkinson et al. |
| 5,330,843 A * | 7/1994 | Ou ........................ C04B 14/208 252/378 R |
| 2003/0060555 A1 | 3/2003 | Lorah et al. |
| 2005/0209386 A1* | 9/2005 | Atkinson ................ C04B 30/00 524/442 |

FOREIGN PATENT DOCUMENTS

| GB | 2326201 A | | 12/1998 | |
| GB | 2 420 601 | * | 5/2006 | ............... F16J 15/10 |
| GB | 2420601 A | | 5/2006 | |
| JP | 2014015620 A | | 1/2014 | |
| KR | 20010112749 A | | 12/2001 | |
| WO | 2008045077 A1 | | 4/2008 | |
| WO | 2014111735 A1 | | 7/2014 | |

OTHER PUBLICATIONS

Office Action from related EP Application No. 167249507 dated Feb. 7, 2019, 7 pages.
Examination Report from related EP Application No. 167249507 dated May 19, 2021, pp. 1-10.
Office Action from related CN Application No. 201680029111.2 dated Oct. 12, 2020, 10 pages.
International Search Report and Written Opinion in related International Application No. PCT/GB2016/051450 dated Aug. 19, 2016, 9 pages.

* cited by examiner

*Primary Examiner* — Pegah Parvini
(74) *Attorney, Agent, or Firm* — Kilpatrick Townsend & Stockton LLP (57) ABSTRACT

A water resistant sealing material suitable as a gasket or valve seal is described. The sealing material comprises modified chemically exfoliated vermiculite (CEV) in a proportion of 30-70% w/w sealing material and a filler in a proportion of 70-30% w/w sealing material, and optionally other additives in a proportion of 0-10% w/w sealing material. The modified CEV comprises water resistance enhancing monovalent cations. The sealing material is particularly useful to provide improved water resistance in gaskets and valve seals.

21 Claims, 1 Drawing Sheet

SEALING MATERIAL

CROSS-REFERENCE TO RELATED APPLICATIONS

This application is the U.S. national phase of International Application No. PCT/GB2016/051450 filed on May 19, 2016, and published on Nov. 24, 2016 as International Publication No. WO 2016/185220 A1, which application claims priority to and the benefit of British Application No. 1508628.3, filed on May 20, 2015, British Application No. 1509650.6, filed on Jun. 3, 2015 and 1606561.7, filed Apr. 14, 2016, the contents of all which are incorporated herein by reference in their entireties.

FIELD OF THE INVENTION

The present invention relates to sealing material for gaskets and valve seals, more specifically, the present invention relates to a gasket and/or a valve seal with improved water resistance.

BACKGROUND OF THE INVENTION

Chemically Exfoliated Vermiculite (CEV) is formed by treating the vermiculite ore and swelling it in water. In one possible preparation method, the ore is treated with saturated sodium chloride solution to exchange magnesium ions for sodium ions, and then with n-butyl ammonium chloride to replace sodium ions with n-butyl ammonium ions. Alternatively, the ore may be treated with saturated lithium citrate solution in a one step process. On washing of the treated ore with water swelling takes place. The swollen material is then subjected to high shear to produce an aqueous suspension of very fine (diameter below 50 μm) vermiculite particles. Other chemical treatment agents are known to those skilled in the art.

U.S. Pat. No. 4,219,609 discloses contacting pure exfoliated vermiculite with the vapour of a concentrated solution of ammonia (or amine) in water. Ammonia dissociates in water to form ammonium hydroxide, but the dissociation constant of ammonia in water is $1.8 \times 10^{-5}$ at 25° C. Accordingly, the level of ammonium in the vapour or solution is very low. Example 1 looks at the effect of the vapour from an ammonia solution on n-butyl ammonium exchanged vermiculite, with exposure for 3 days. This method may involve the binding of the amine to the clay surface above the solution.

U.S. Pat. No. 5,330,843 relates to waterproofing a pure exfoliated vermiculite article, such as a film, and for application in gaskets. The method involves contacting a delaminated vermiculite article with a solution of an inorganic monovalent cation. Sodium is the preferred cation. Other materials can include composites but the examples of these are paper and membranes in which pure vermiculite is present as a separate phase. No testing of the films is carried out under load.

GB1,016,385 discloses that pure vermiculite films can be stabilised by exposure to polyvalent cation solutions, the examples used are magnesium chloride and aluminium chloride.

It is known that chemically exfoliated vermiculite films which are composites of CEV and filler have generally poorer water resistance than films made up of CEV alone.

Surprisingly, the inventors have found that modified composite gaskets and valve seals according to the invention provide improved water resistant film and sealing material.

It is therefore an object of aspects of the present invention to provide gaskets, valve seals, sealing materials for gaskets or valve seals, gasket sealing layers, valve packing rings and/or gasket sheets with improved water resistance.

DETAILED DESCRIPTION OF THE INVENTION

According to a first aspect of the present invention there is provided a water resistant sealing material comprising modified chemically exfoliated vermiculite (CEV) in a proportion of 30-70% w/w sealing material and a filler in a proportion of 30-70% w/w sealing material, and optionally other additives in a proportion of 0-10% w/w sealing material, wherein the modified CEV comprises water resistance enhancing monovalent cations.

The sealing material may be dynamic or static sealing material. For instance, the sealing material of the invention may be a valve seal sealing material or the sealing material may be a gasket sealing material.

Suitable applications for valve seals include valve stem seals such as valve stem oil seals.

It will be apparent from the foregoing aspects of the invention that the sealing material is a composite. The sealing material may be in the form of a sheet. Such sheets can be cut or formed into appropriate shapes for use as a gasket or as a sealing layer of a gasket. Alternatively, the sealing material/sheet may be formed into rings for use as valve packing rings. Suitably, the sheets may be cut and then press formed, such as die formed, into rings for use as valve packing rings. Accordingly, in an embodiment of the first aspect, the invention extends to a water resistant gasket composite sealing sheet or valve composite packing ring comprising modified chemically exfoliated vermiculite (CEV) in a proportion of 30-70% w/w sealing sheet or ring and a filler in a proportion of 30-70% w/w sealing sheet or ring, and optionally other additives in a proportion of 0-10% w/w sealing sheet or ring, wherein the modified CEV comprises water resistance enhancing monovalent cations.

By water resistance enhancing monovalent cations is meant cations which improve the water resistance of the sealing material, sheet, ring or layer. Water resistance may be manifest by preventing the filler from softening and extruding from the sealing material such as in a gasket/sealing layer/sheet/valve seal or valve packing ring, which reduces the structural integrity thereof. The water resistance enhancing monovalent cations herein can be introduced by cation exchange with cations, suitably, other monovalent cations, in the unmodified CEV. It will be appreciated that the water resistance enhancing monovalent cations are generally cations of an element of the periodic table or molecule other than monovalent cations which are generally replaced in the unmodified CEV such as lithium or n-butyl ammonium ($C_4H_9NH_3^+$). Therefore, the water resistance enhancing monovalent cations are suitably more water resistance enhancing than a lithium cation, more suitably than a lithium and/or $C_4H_9NH_3^+$ monovalent cation.

It will be appreciated from the foregoing that the water resistance enhancing monovalent cations in the CEV are typically present at cation exchange sites in the CEV.

Suitably, in accordance with any aspect of the present invention, the water resistance enhancing monovalent cations are present in the CEV of the water resistant sealing material such as in a gasket sealing layer/sheet/valve seal/ valve packing ring of the present invention at a higher level, typically, at these cation exchange sites, than that found in the unmodified CEV. Suitably, at a least a two-fold level of increase, more suitably, at a level of increase of at least ×10, most suitably by a level of increase of at least ×10$^2$, especially by a level of increase of at least ×10$^3$. As the waterproof enhancing monovalent cations are typically present at the cation exchange sites they are exchangeable cations. Thus, waterproof enhancing monovalent cations in the sealing material such as in a gasket sealing layer/sheet/ valve seal/valve packing ring of the present invention at the cation exchange sites may be referred to as exchangeable cations.

According to a second aspect of the present invention there is provided a water resistant gasket comprising a sealing layer and optionally a core and/or support for the sealing layer, the sealing layer comprising modified chemically exfoliated vermiculite (CEV) in a proportion of 30-70% w/w sealing layer, and filler in a proportion of 30-70% w/w sealing layer, and optionally other additives in a proportion of 0-10% w/w sealing layer, wherein the modified CEV comprises water resistance enhancing monovalent cations.

According to a further aspect of the present invention there is provided a water resistant gasket or valve seal sealing material comprising modified chemically exfoliated vermiculite (CEV) in a proportion of 30-70% w/w sealing material and a filler in a proportion of 30-70% w/w sealing material, and optionally other additives in a proportion of 0-10% w/w sealing material, wherein the modified CEV comprises water resistance enhancing monovalent exchangeable cations.

According to a still further aspect of the present invention there is provided a water resistant gasket comprising a sealing layer and optionally a core and/or support for the sealing layer, the sealing layer comprising modified chemically exfoliated vermiculite (CEV) in a proportion of 30-70% w/w sealing layer, and filler in a proportion of 30-70% w/w sealing layer, and optionally other additives in a proportion of 0-10% w/w sealing layer, wherein the modified CEV comprises water resistance enhancing monovalent exchangeable cations.

According to a further aspect of the present invention there is provided a water resistant valve seal comprising sealing material comprising modified chemically exfoliated vermiculite (CEV) in a proportion of 30-70% w/w sealing material, and filler in a proportion of 30-70% w/w sealing material, and optionally other additives in a proportion of 0-10% w/w sealing material, wherein the modified CEV comprises water resistance enhancing monovalent cations.

According to a further aspect of the present invention there is provided a water resistant valve seal comprising sealing material comprising modified chemically exfoliated vermiculite (CEV) in a proportion of 30-70% w/w sealing material, and filler in a proportion of 30-70% w/w sealing material, and optionally other additives in a proportion of 0-10% w/w sealing material, wherein the modified CEV comprises water resistance enhancing monovalent exchangeable cations.

The sealing material of the valve seal may be in the form of at least a first packing ring. Optionally, the valve seal may include further rings. The further rings may be defined as the sealing material of the first ring or may be otherwise.

It will be appreciated that the term "ring" is a term known in the art and such rings may have any suitable central aperture to accommodate a relevant moving part, such as a square or circular aperture, preferably a circular aperture.

The valve packing ring of the present invention may be continuous or split.

Valve seals can be used in association with rotating or reciprocating parts such as in reciprocating stems or rotating ball valves. As such, the valve seal of any aspect of the present invention may be a valve stem seal or a ball valve seal. Likewise, the valve seal sealing material of any aspect of the present inventive may for example be valve stem seal sealing material or ball valve seal sealing material.

In use, valve seals are placed in a stuffing box and stressed via bolts or similar. The loading is commonly axial and it forces the seal to expand against the valve and the outside of the stuffing box, this creates the seal while allowing the valve to move.

Valve seals typically have multiple stacked layers or rings of sealing material wherein each of the rings may have a particular function.

As such, according to a further aspect of the present invention the valve seal comprises two or more rings of sealing material, suitably at least three, four, five or six and/or up to fifteen, twelve, ten or eight rings of sealing material, wherein at least one of the rings of sealing material comprises sealing material according to the present invention.

A valve ring of sealing material according to the present invention may preferably be used as the header and/or footer ring of the valve seal. This may be preferable when, for example, temperatures are above the limit for graphite oxidation or oxidizing chemicals (such as NOx gases) are the media.

Optionally, at least one of the further rings of sealing material in the valve seal of the present invention may comprise graphite. Graphite is more self lubricating than vermiculite and may preferably be used in an intermediate further ring between valve rings according to the present invention to help provide lubrication to the rotating or reciprocating component. When rings comprising sealing material according to the present invention are used as headers and/or footers of the seal, these seals can protect the graphite layers from the media or atmospheric oxygen, preventing its oxidation. The seal may comprise at least two further rings of sealing material comprising graphite, such as at least three, four or five, and/or the seal may comprise up to ten, eight or six layers of further sealing rings comprising graphite.

The rings and further rings of sealing material of the valve seal may be configured to be arranged co-axially, in use.

The seal of the present invention may be particularly useful when the valve seal is subjected to a hydro-test before use. In this situation the valve or valve/pipe set is pressurized with high pressure water to check for leaks before the media is introduced. This hydro-test may soften or otherwise compromise the bottom (footer) seal if it were made of sealing material containing unmodified CEV.

Preferably, in accordance with any aspect of the present invention, at least 1%, more preferably, at least 5%, most preferably, at least 10% of the exchangeable cations in the gasket/sealing layer/sealing material/ring or sheet are waterproof enhancing monovalent cations, especially, at least 25%, more especially at least 50%, for example 70 or 80 or 90 or about 100%.

Suitably, the water resistant gasket or valve sealing material/gasket/sheet/ring is water resistant compared to a gasket or valve sealing material/gasket/sheet/valve seal/ring that is the same as the water resistant gasket or valve sealing material/gasket/sheet/valve seal/ring except for containing unmodified CEV, that is CEV that has not been subject to cation enhancing exchange with water resistance enhancing monovalent cations after formation of the unmodified CEV material, as detailed above. Suitably, the gasket or valve sealing material/gasket/sheet/valve seal/ring is water resistant as compared to a gasket or valve sealing material/gasket/sheet/valve seal/ring that is the same as the water resistant gasket or valve sealing material/gasket/sheet/valve seal/ring except for containing exchangeable non-water resistance enhancing monovalent cations at an equivalent concentration level as the water resistance enhancing monovalent exchangeable cations. Suitably, an equivalent amount in either case is saturation of the CEV therewith. Suitably, as existing monovalent cations in the unmodified CEV, lithium, n-propyl ammonium and n-butyl ammonium are not regarded as water resistance enhancing or are regarded as non-water resistance enhancing monovalent cations. Suitably, therefore, the water resistance enhancing monovalent cation is other than lithium, n-propyl ammonium or n-butyl ammonium.

Typically, the water resistance enhancing monovalent cation of any aspect is selected from at least one of an alkali metal, ammonium or a quaternary ammonium compound. The replacing monovalent cations may be more typically selected from one or more of, sodium, potassium, rubidium, caesium, francium, ammonium, or a quaternary ammonium compound of formula $R_4N^+$ wherein R is selected from methyl, ethyl or a combination thereof. Preferred water resistance enhancing monovalent cations in accordance with any aspect of the present invention are potassium, ammonium and sodium, more suitably, potassium and ammonium, most suitably, potassium.

Mixtures of two or more water resistance enhancing monovalent cations may be in any proportion. Suitable combinations of cations include K/Na, K/Rb and K/Cs. Typically, where a mixture of two cations is present, they are applied from solution in the range 1:10 to 10:1 ($mol.dm^{-3}$:$mol.dm^{-3}$).

Preferably, the CEV and filler are intimately mixed and preferably, each evenly distributed throughout the sealing material/layer/sheet/ring so that they form a generally homogenous mixture. As mentioned above, the water resistance enhancing monovalent cation may be introduced by cation exchange with the cations in the unmodified CEV. The monovalent cation exchange is believed to generally take place on the surface and/or between the vermiculite lamellae where the exchangeable cations of the unmodified CEV are replaced by the water resistance enhancing monovalent cations.

Typical levels of CEV in the sealing material, sheet, layer or ring of any aspect are in the range 30-68% w/w, more typically, 35-65% w/w, most typically, 40-60% w/w sealing material/layer.

Typical levels of filler in the sealing material, sheet, layer or ring of any aspect are in the range 32-70% w/w, more typically, 35-65% w/w, most typically, 40-60% w/w sealing material/layer.

Optionally, further additives may be present in the sealing material, sheet, layer or ring of any aspect in the range 0-8% w/w, more typically, 0-5% w/w, most typically, 0-3% w/w sealing material/layer.

It will be appreciated that the combined level of CEV and filler will not exceed 100% w/w in the sealing material, sheet, layer or ring and may be from 90% w/w in the presence of other additives so that the level selected in the ranges above should be combined accordingly.

Suitable further additives may be selected from reinforcing agents such as milled glass fibre or rubber.

The extent of cation exchange of the sealing material/layer/sheet/ring depends on a number of factors. However, although the exchange takes place in the chemically exfoliated vermiculite, the filler may have the effect of creating nano-spacing of the platelets to thereby maximise cation exchange.

Typically, the modified CEV is at least 70% cation exchanged with water resistance enhancing monovalent cation, more typically, at least 80% cation exchanged, most typically, at least 90% cation exchanged, where 100% exchanged is taken to mean full saturation with water resistance enhancing monovalent cation. However, water resistance enhancement is obtained at much lower levels of exchange and therefore the modified CEV may only be at least 1% cation exchanged, for example, at least 5 or 10 or 25 or 50% cation exchanged with water resistance enhancing monovalent cation. Exchange up to full saturation of the modified CEV may be determined by powder X-ray diffraction. For example, when an unmodified CEV sample saturated with lithium ions is treated with a solution of water resistance enhancing cations, as the water resistance enhancing cations replace the lithium cations in the CEV powder, X-ray diffraction can be used to show replacement of a peak corresponding to lithium cations and the respective layer spacing with a second peak corresponding to the water resistance enhancing cations and the respective layer spacing.

"Full saturation" is intended to mean that the cations of the unmodified CEV present in the monovalent cation exchange sites, typically the exchange sites between the vermiculite lamellae, are approximately completely exchanged for the water resistance enhancing cations. It will be apparent that as result of, for example, mechanical blockages, differences in temperature, pressure etc, the full exchange for water resistance enhancing monovalent cations at the monovalent cation exchange sites may not be possible. As such, suitably, approximately completely exchanged may be at least 95% exchanged, such as at least 96%, 97%, 98%, 99% or at least 99.5% exchanged. During preparation of the unmodified CEV, a large excess of the exfoliating cation such as lithium or n-butyl cations is generally used. It is expected that this excess causes substantially all of the available monovalent cation exchange sites of the vermiculite to be occupied in the CEV. As such, the definition of "full saturation" provided above will also generally mean that at least 90% such as at least 95%, 97%, 98%, 99%, 99.5% or substantially all the available monovalent cation exchange sites in the CEV are occupied by the water resistance enhancing cations.

The gasket may be multi-layered or unilayered. In the case of a unilayered gasket the sealing material or layer is shaped so as to form the entire gasket whereas in a multi-layered gasket which may have two or more layers the sealing material may form one or more layers of the gasket and the core and/or support may form other layers. In one embodiment, the gasket is in the form of a core interposed between two sealing layers which are typically but not necessarily generally contiguous therewith. Such a gasket is typically shaped so as to be interposed between mating surfaces of mating parts to thereby provide a seal therebetween. In an embodiment, the gasket may be in the form of a support layer and a sealing layer thereon which is typically but not necessarily generally contiguous therewith. The gasket may be in the form of a laminate or the support layer may be interpenetrated by the sealing layer. Such interpenetration may be effected by, for example a gauze or wire mesh support interpenetrated by the sealing layer to thereby reinforce the sealing layer.

In a further embodiment of a multi-layered gasket, further layers may be applied to the sealing layer, for instance, the sealing layer may have a further layer or coating interposed between the sealing layer and the respective mating surface, in use. Such further layers are known to the skilled person and depend on the application in which the gasket is to be used.

It will therefore be appreciated that the gasket sealing material or layer may be used in any suitable gasket application. Typical embodiments include:-kammprofile, spirally wound and steel core gaskets which may benefit from the enhanced water resistance of the sealing material of the present invention.

Advantageously, a sealing material or gasket or valve seal or sealing foil of the present invention provides improved water resistance. Without being bound by any theory, evidence suggests that merely contacting a filler free CEV sealing material or layer/ring with a relevant cation in the form of a cation solution may reach saturation more slowly than a sealing layer/ring or material with filler according to the invention. Accordingly, sealing layers/rings or materials including filler according to the invention are able to be exchanged more effectively than filler free sealing materials. Surprisingly, this has led to enhanced water resistance in such materials.

In accordance with any aspect of the present invention, the sealing material/layer/sheet/ring is cation exchanged by contact with the water resistance enhancing monovalent cation, typically, by contact of the sealing material/layer/sheet/ring having unmodified CEV with a solution of the relevant monovalent cation.

In some embodiments, the water resistance enhancing monovalent cation is introduced to the sealing material/layer/sheet/ring having unmodified CEV as a citrate or chloride salt, typically a solution thereof, preferably as a citrate salt.

Preferably, the fillers of any aspect of the present invention are inert fillers. By inert fillers is meant not effective as binders in the gaskets or value seals or sealing materials of the present invention and/or generally chemically inert in the applications of the gasket or value seals of the invention. Suitably, the fillers are non-hygroscopic, unreactive with water and/or are not reinforcing.

Suitable inert fillers are plate-like or particulate fillers known to those skilled in the art. Plate-like filler in the context of the present invention means fillers which adopt plate, layered or leaf shaped structures in the sealing material. Plate-like fillers include talc, other forms of vermiculite and mica. Other forms of vermiculite include thermally exfoliated vermiculite. Suitable particulate fillers include amorphous silica, quartz silica and calcium carbonate.

It has been found that the introduction of a plate-like or particulate filler to the CEV to form a film, typically one intimately mixed therewith, provides improved water resistance enhancing monovalent cation exchange upon contact therewith, suitably a solution thereof.

Typically, the $d_{50}$ average particle size of the filler as, for example, determined by light scattering with a Malvern Mastersizer is in the range 10 nm to 50 μm, more preferably, 50 nm to 30pm, most preferably 500 nm to 25 μm.

Typically, the $d_{50}$ average particle size of the CEV, as, for example, determined by light scattering with a Malvern Mastersizer is in the range 1 μm to 100 μm, more preferably 5 μm to 50 μm, most preferably 10 μm to 30 μm.

The surface area of the filler as determined by nitrogen absorption such as ISO 9277 is less than 200 $m^2/g$, more preferably less than 10 $m^2/g$, most preferably less than 5 $m^2/g$.

Under ambient conditions the d-spacing (clay-clay layer spacing) of the CEV in the sealing material or gasket sealing material of the present invention as determined by X-ray diffraction suitably lies within the range 10-12 Å, as may be suitably measured by a PANalytical XPert MPD theta-theta diffractometer, using Cu $K_\alpha$ radiation ($\lambda$=1.5418 Å), calibrated using a Si standard and equipped with a Ni filter and curved graphite monochromator in the diffracted beam, and operating in Bragg-Brentano reflection geometry. A 1 cm×1 cm square of the sample was illuminated using programmable divergence and anti-scatter slits. The X-ray tube was operated at 40 kV and 40 mA.

It will be appreciated that two or more of the optional features of any aspect of the invention may be combined with any aspect of the invention mutatis mutandis.

According to a third aspect of the present invention there is provided a process of production of valve or gasket sealing material comprising the steps of:
a) mixing chemically exfoliated vermiculite (CEV) with a filler to form an intimate mixture thereof:
b) optionally, forming a sheet from the mixture;
c) optionally drying the said sheet formed from the mixture; and
d) monovalent cation exchange of the mixture/sheet/dried sheet by contact thereof with a solution of a water resistance enhancing monovalent cation.

Suitably, the CEV may be formed by treating vermiculite ore with lithium citrate solution followed by washing of the treated ore. Treatment with other cations is also possible. Suitably, however, the vermiculite ore is treated with lithium citrate. As such, the CEV of step a) may be at least partially, and preferably completely, treatment cation saturated. The treatment cation may be any suitable cation but is typically, lithium, n-butyl ammonium ((n-butyl)$NH_3^+$), or n-propyl ammonium ((n-propyl)$NH_3^+$), more typically, lithium. A pre-treatment step of the vermiculite ore with sodium is typically required when (n-butyl) $NH_3^+$ or (n-propyl) $NH_3^+$ is used as the treatment cation.

Suitably, the effect of the contact step d) is to cause the water resistance enhancing monovalent cations to be present in the CEV of the water resistant valve or gasket sealing material at a higher level than that found in the unmodified CEV, typically, at the cation exchange sites. Suitably, the water resistance enhancing monovalent cations are present at at least a two-fold level of increase, more suitably, at a level of increase of at least ×10, most suitably by a level of increase of at least ×$10^2$, especially by a level of increase of at least ×$10^3$.

Alternatively, the waterproof enhancing monovalent exchangeable cations are present in the range 1×$10^{-5}$-5×$10^{-2}$ moles $g^{-1}$, more preferably, 1×$10^{-4}$-1×$10^{-2}$ moles $g^{-1}$, most preferably, 2×$10^{-4}$-5×$10^{-3}$ moles $g^{-1}$ sealing material. Cation exchange and chemical analysis can determine the amount of exchangeable cations in total and of a particular type in the materials, sheets or gaskets according to the invention. Such techniques are well known to the skilled person and can determine the cation exchange capacity (CEC) of the material i.e. the amount of exchangeable cations. As detailed above, preferably, in accordance with any aspect of the present invention, at least 1%, more preferably, at least 5%, for example, 10% of the exchangeable cations in the gasket/sealing layer/sealing material/ sheet/valve sealing material or ring are waterproof enhancing monovalent cations, especially, at least 25%, more especially, at least 50%, for example at least 70 or 80 or 90 or 100%.

Preferably, after mixing of the CEV, typically wet CEV in slurry form, although dry powder CEV may be added to increase the CEV content, and the filler, the intimate mixture is formed into a sheet and at least partially dried prior to cation exchange. Optionally, a gasket sealing layer or valve ring is formed from the sheet and optionally still further this may be incorporated into a gasket or valve seal prior to cation exchange. Optionally, the valve ring is formed from the sheet by press forming, such as die forming. As such, optionally, step d) is monovalent cation exchange of the gasket sealing layer or valve sealing material by contact thereof with a solution of a water resistance enhancing monovalent cation either before or after incorporation of the sealing layer/material into a gasket/valve seal.

Cation exchange is preferably carried out by contacting the sealing material, sheet or gasket/gasket sealing layer or valve sealing material/packing ring with a solution of the relevant cation, typically an aqueous solution thereof.

The waterproof enhancing monovalent cation contacting the material, sheet or gasket/valve sealing material to be cation exchanged is typically in excess of that required stoichiometrically to exchange all the cation exchange sites i.e. at least 95%, more typically, approximately 100%.

Preferred exposure times for contact of material, sheet or gasket/valve sealing material with a solution of the waterproof enhancing monovalent cation are 1-180 minutes, more preferably, 5-180 minutes, more preferably 15-60 minutes, for instance, at least 2 minutes, more typically at least 10 minutes, most preferably, at least 20 minutes.

Suitably, the material, sheet or gasket/gasket sealing layer or valve sealing material/packing ring is contacted with a solution of the relevant cation by immersion of the material, sheet or gasket/gasket sealing layer or valve sealing material/packing ring in the solution, preferably by dipping of the material, sheet or gasket/gasket sealing layer or valve sealing material/packing ring in the solution. Optionally, the solution is applied to the material, sheet or gasket/gasket sealing layer or valve sealing material/packing ring by coating of the solution onto the material, sheet or gasket/ gasket sealing layer or valve sealing material/packing ring, typically followed by rinsing with deionised water. This application method can be advantageous for larger sheets or gaskets/valve seals where immersion would not be commercially viable.

Advantageously, it has been found that exchange of the sheet, typically dried sheet, by a cation solution is more effective in producing a flexible sheet with improved water resistance than adding a cation exchanging solution directly to the mixture of wet/dry unmodified CEV and filler before forming. In such cases, the subsequent sheets have been found to be too brittle for most applications.

In addition, the inventors have found that adding the cation solution to the wet/dry unmodified CEV prior to addition of filler does not lead to effective sheet formation.

It will be appreciated that two or more of the optional features of any aspect of the invention or the first and/or second and/or third and/or further aspects may be combined with any aspect of the invention or the first and/or second and/or third and/or further aspect mutatis mutandis.

Preferably, the sealing material, sheet or layer/ring according to any of the aspects herein may be compacted and such compaction may be carried out prior to use or prior to cation replacement. Alternatively, the compacting may take place during formation, such as cutting, from the sheet. Compacting potentially enhances the integrity of the sheet and improves performance. Typically, the density of uncompacted sheet or layer/ring is 0.9 g/cm$^3$ to 1.5 g/cm$^3$; more preferably 1.0 g/cm$^3$ to 1.4 g/cm$^3$, more preferably 1.1 g/cm$^3$ to 1.3 g/cm$^3$. Suitable compacting pressures for gaskets will result in a sheet or layer/ring of density in the range 1.0-2.1g/cm$^3$, more preferably 1.2 g/cm$^3$ to 2.0 g/cm$^3$, most preferably 1.6 g/cm$^3$ to 1.9 g/cm$^3$. Suitably, compacting pressures for valve sealing materials/packing rings may result in a sheet or layer/ring of density in the range of 1.1-2.7 g/cm$^3$, more preferably 1.3-2.5 g/cm$^3$, most preferably 1.6-2.2 g/cm$^3$.

The concentration of the cation in the monovalent cation solution is not particularly limited but may be in the range 0.1-10 mol.dm$^{-3}$, more preferably, in the range 0.5-5 mol.dm$^{-3}$, most preferably, in the range 1-3 mol.dm$^{-3}$. Generally, the cation is fully solvated and any concentration up to a saturated solution may be used for the cation exchange step.

In embodiments wherein the cation solution is coated onto the sealing material, sheet or layer/ring, the concentration of the cation in the monovalent cation solution is generally higher than for immersion application methods. Typically, when the cation solution is coated onto the sealing material, sheet or layer/ring, the concentration of the cation in the monovalent solution is in the range 1 mol.dm$^{-3}$ to 10 mol.dm$^{-3}$ such as 5 mol.dm$^{-3}$ to 10 mol.dm$^{-3}$, more preferably 7 mol.dm$^{-3}$ to 10 mol.dm$^{-3}$ most preferably 8 mol.dm$^{-3}$ to 9.5 mol.dm$^{-3}$ Suitably, in accordance with the present invention, the gasket/sheet/sealing layer/sealing material/packing ring may be immersed in a solution of 0.2-3.0 mol.dm$^{-3}$ for a period of between 5-180 minutes, more preferably a solution of 0.3-1.0 mol.dm$^{-3}$ for a period of between 15-60 minutes.

The valve sealing material may be treated by contact with a solution of a water resistance enhancing monovalent cation when in position around the valve. Accordingly, optionally, in step (d) the solution of water resistance enhancing monovalent cations may be contacted with the valves sealing materials when they are in position around the valve. Suitably, in such an embodiment the sealing material is not compressed to its target density before contact with the solution. The seals may be fully densified after treatment.

A significant increase in water resistance can be shown by weighing treated and untreated seals after immersion in water.

Definitions

Where values are given in % w/w herein these are based on dry weight unless indicated otherwise. Where values are given as a percentage of cations these are on a numerical or molar basis.

It will be appreciated that sheets, layers and sealing material herein in relation to valve seals are generally synonymous with rings or packing rings of such seals. However, this does not exclude the possibility for a single packing ring to have multiple layers or be produced from multiple sheets.

Figure 1:
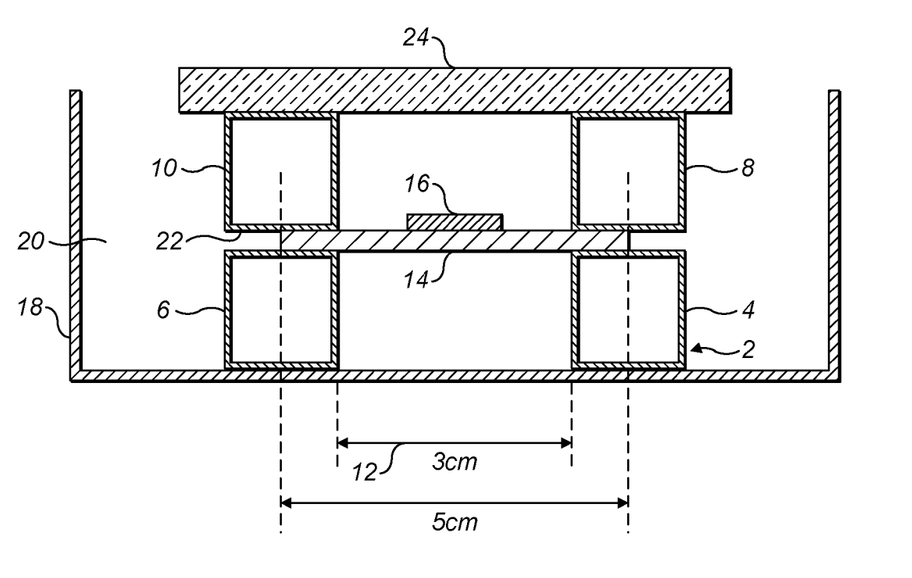
FIG. 1 is a cross-sectional view of a beam test apparatus.

For a better understanding of the invention, and to show how embodiments of the same may be carried into effect, reference will now be made, by way of example only, to the following examples and figures in which:

FIG. 1 is a beam test apparatus.

EXAMPLES

Method

Example foils were prepared from the dough composition formulations described in Table 1 by mixing of the components to form a wet dough and then by drawing a doctor blade in a casting direction across wet dough to spread an even coating over a support layer (140 gsm paper, Cresta "D"). The coating was dried and the support layer removed by peeling back from the dried coating. The dried coating was cut with the longer dimension parallel to the casting direction ("with" grain) into 5 cm×2 cm foil coupons. Samples for gas Leakage testing (DIN) at 90 mm OD×50 mm ID were also cut.

Due to the varying viscosities of the mixes, deionised water had to be added to the initial dough formulations to obtain a consistency that was castable into foils. These water additions are shown in table 1. After mixing and casting into foils, the foils were consolidated, unless indicated otherwise, to approximately 0.6 mm thickness when dry, before cutting coupons as described above. The specific thicknesses and densities are recorded in Table 1.

Summary data for the fillers used is given in Table 2.

TABLE 2

| | | Filler Data | | |
|---|---|---|---|---|
| Name | Type | Specific Surface Area ($m^2/g$) | Oil Adsorption (g/100 g) | Median Particle Size ($d_{50}$) |
| HPF 2 | Silica (Quartz) | 0.6 | 24 | 15 μm |
| VN3 | Silica (Amorphous) | 180 | — | 14 nm |
| MKT | Muskovite Mica | 7.2 | 64 | 4.5 μm |
| D200 | Talc | 3-5 | 38 | 21 μm |
| D2500 | Talc | 3-5 | 67 | 5 μm |

Cut coupon films of the above formulations were then cation exchanged by immersion in the salt solutions 1-4 or spiral wound gaskets were immersed in salt solutions 5 and 6.

TABLE 1

Composition of Trial Foils Prior to Exchange

| | Dough Composition | | | | | Dry Film | | | Gas Leakage | |
|---|---|---|---|---|---|---|---|---|---|---|
| Formulation | CEV slurry - kg Wet | PCEV added - kg | Filler - kg | Dough Solids (%) | Additional Water (L) | CEV (% Dry) | Filler (% Dry) | Dry Film Thickness (mm) | Dry Film Density (g/cm$^3$) | (prior to exchange) (ml/min) | Comments |
| Preparative Example 1 | 5.00 | | 0.94 | 29 | | (45) | Talc D200 (55) | 0.71 | 1.90 | 0.37 | |
| Preparative Example 2 | 5.00 | | 0.94 | 29 | | (45) | Talc D200 (55) | 0.61 | 1.30 | 0.93 | Unconsolidated |
| Comparative Preparative Example 1 | 5.00 | 0.32 | | 21 | | (100) | — | 0.61 | 1.28 | 0.01 | |
| Preparative Example 3 | 5.00 | 0.34 | 0.60 | 29 | | (65) | Talc D200 (35) | 0.55 | 1.21 | 0.10 | |
| Comparative Preparative Example 2 | 3.00 | | 1.88 | 29 | 3.20 | (20) | Talc D2500 (80) | | | | Too brittle to cut - not tested |
| Preparative Example 4 | 5.00 | | 0.76[a] 0.19[b] | 27 | 0.50 | (45) | Talc D200:VN3 4:1 (55)* | 0.73 | 1.56 | 1.32 | |
| Preparative Example 5 | 5.00 | | 0.42 | 21 | 0.33 | (65) | VN3 (35) | 0.67 | 1.31 | 0.09 | |
| Preparative Example 6 | 5.00 | | 0.94 | 27 | 0.50 | (45) | MKT Mica (55) | 0.64 | 1.89 | 6.45 | |
| Preparative Example 7 | 5.00 | | 0.47[a] 0.47[c] | 27 | 0.5 | (45) | Talc D200:HPF2 1:1 (55)* | 0.65 | 1.62 | 6.10 | |
| Preparative Example 8 | 5.00 | | 0.94 | 29 | | (45) | HPF2 (55) | 0.71 | 1.78 | >50 | |
| Preparative Example 9 | 2.00 | 1.20 | 0.38 | 25 | 4.0 | (80) | Talc D200 (20) | 0.68 | 1.45 | 0.02 | |
| Preparative Example 10 | 5.00 | | 1.83 | 27 | 2.8 | (30) | Talc D2500 (70) | 0.64 | 1.42 | 6.60 | |

*Total
[a]Talc Magsil D200
[b]Ultrasil VN3
[c]HPF2 Silica

1. "Control" (untreated samples)
2. Samples first immersed in 0.33 M Potassium Citrate (1 N K$^+$) before rinsing twice in deionised water and drying at 40° C. for 3 hours.
3. As 2) with 1 M Potassium Chloride (1 N K$^+$)
4. As 3) with 1 M Sodium Chloride (1 N Na$^+$)
5. 0.33M Caesium Citrate, procedure detailed below
6. 1.0M Ammonium Citrate, procedure detailed below Immersion (Beam) tests were performed on coupons treated according to conditions 1 to 4 above using the apparatus illustrated in FIG. 1.

A framework 2 for the immersion beam test was constructed from 16 mm square section PVC conduit. A pair of spaced opposed conduits 4, 6 were arranged in a parallel manner with a second identical pair 8, 10 superposed on the first pair so as to leave a gap 22 there between to accommodate and clamp a test coupon 14 extending perpendicularly between the sets of superposed conduits so that the ends thereof are clamped between first 4, 8 and second 6, 10 superposed conduits. The test coupon 14 thus bridges the gap 12 between the set of superposed conduits. A glass plate weight (360 g) 24 is rested on the respective second conduits 8, 10 to thereby prevent the coupon moving during the test. The test coupon 14 and framework 2 is designed to support 1 cm at each end of the test coupon, leaving 3 cm unsupported bridging the space 12 between the conduits. A £1 coin (weight 9.5 g, diameter 22.5 mm; thickness 3.15 mm) 16 was rested on the centre of each coupon. For testing, the framework 2 was placed in a clear polypropylene container 18. The coupons were all mounted such that the surface exposed to air during casting was facing down.

The container was filled with 1 L of de-ionised water 20 so as to submerge the coupons and the coupons observed continuously for 1 to 2 hours and at intervals thereafter for 24 hours.

At 8 and 24 hours, the deterioration of the coupons which had not collapsed was assessed by measuring the downwards deflection of the coupons in mm from the horizontal, by eye, using a set square with mm graduations. The time taken for each coupon to collapse was recorded where appropriate.

Results
1. Control:

In table 3 below, the comparative example numbers match the respective preparative example numbers in table 1 except comparative preparative example 1 is designated comparative example 11 while times to collapse in the beam test are given in minutes:secs

TABLE 3

Control Test results

| Formulation reference | Time to collapse (minutes:secs) |
| --- | --- |
| Comparative Example 1 | 9:44 |
| Comparative Example 2 | 2:17 |
| Comparative Example 3 | 2:31 |
| Comparative Example 4 | 4:08 |
| Comparative Example 5 | 9:30 |
| Comparative Example 6 | 8:18 |
| Comparative Example 7 | 3:59 |
| Comparative Example 8 | 7:15 |
| Comparative Example 9 | 23:04 |
| Comparative Example 10 | 0:38 |
| Comparative Example 11 | 37:35 |

Samples of 100% CEV, Comparative Example 11, lasted considerably longer than the samples containing a filler (Comparative Examples 1-10). The consolidated sample Comparative Example 1 lasted longer than unconsolidated sample Comparative Example 2.

2. 0.33 M (1 N) Potassium Citrate

In table 4 below, the examples produced by immersion in salt solution 2 above are shown as examples 1-10 and comparative example 12. The numbers of examples 1-10 match the respective preparative numbers of table 1, except comparative preparative example 1 is designated comparative example 12.

In table 4 times to collapse in the beam test are given in minutes. However, all of the samples except the 100% CEV comparative example 12 remained unbroken after 48 hours; the vertical deflection (in mm) of the beams is recorded after 8 hours, after 24 hours, and after 48 hours.

TABLE 4

Potassium Citrate Test Results

| Example | Time to collapse (minutes) | Vertical deflection after 8 hours (mm) | Vertical deflection after 24 hours (mm) | Vertical deflection after 48 hours (mm) |
| --- | --- | --- | --- | --- |
| Example 1 | — | 0 | 0 | 0 |
| Example 2 | — | 0 | 0 | 0 |
| Example 3 | — | 0 | 0 | 0 |
| Example 4 | — | 0 | 0 | 0 |
| Example 5 | — | 2 | 2 | 2 |
| Example 6 | — | 0 | 0 | 0 |
| Example 7 | — | 0 | 0 | 0 |
| Example 8 | — | 1 | 1 | 1 |
| Example 9 | — | 2 | 2 | 2 |
| Example 10 | — | 1 | 1 | 1 |
| Comparative Example 12 | 230 | — | — | — |

3. 1 M (1 N) Potassium Chloride

In table 5 below, the examples produced by immersion in salt solution 3 above are shown as examples 11-20 and comparative example 13. Examples 11-20 use the preparative examples 1 to 10 respectively. Comparative example 13 uses comparative preparative example 1.

TABLE 5

Potassium Chloride Test Results

| Example | Vertical deflection after 8 hours (mm) | Vertical deflection after 24 hours (mm) | Vertical deflection after 48 hours (mm) |
| --- | --- | --- | --- |
| Example 11 | 0 | 0 | 0 |
| Example 12 | 0 | 0 | 0 |
| Example 13 | 0 | 0 | 0 |
| Example 14 | 0 | 0 | 0 |
| Example 15 | 1 | 1 | 1 |
| Example 16 | 0 | 0 | 0 |
| Example 17 | 0 | 0 | 0 |
| Example 18 | 0 | 0 | 0 |
| Example 19 | 1 | 1 | 1 |
| Example 20 | 1 | 1 | 1 |
| Comparative Example 13 | 2 | — | — |

The comparative example 13, containing comparative preparative example 1 was again the only sample to break and did so between 8 and 24 hours.

4. 1 M (1 N) Sodium Chloride

In table 6 below, the examples produced by immersion in salt solution 4 above are shown as examples 21-29 and comparative example 14. Examples 21-29 use the preparative examples 1 to 9 respectively. Comparative example 14 uses comparative preparative example 1.

TABLE 6

Sodium Chloride Test Results

| Example | Vertical deflection after 8 hours (mm) | Vertical deflection after 24 hours (mm) | Vertical deflection after 48 hours (mm) |
|---|---|---|---|
| Example 21 | 0 | 1 | 1 |
| Example 22 | 1 | 1 | 2 |
| Example 23 | 2 | 2 | 3 |
| Example 24 | 1 | 1 | 2 |
| Example 25 | 1 | 1 | 2 |
| Example 26 | 0 | 1 | 1 |
| Example 27 | 1 | 1 | 2 |
| Example 28 | 1 | 1 | 2 |
| Example 29 | 1 | 1 | 2 |
| Comparative Example 14 | 2 | — | — |

Again, comparative example 14 broke between 8 and 24 hours as for solution 3. The remaining samples deflected more than the corresponding examples for solution 3.

5. 0.33M Caesium Citrate

Caesium citrate was prepared at 0.33M concentration by slowly dissolving 66 g of caesium carbonate in a de-ionised water solution of 42 g citric acid monohydrate (both from Sigma Aldrich). The solution was made up to 400 ml before use, and left to stand for 24 hours to allow excess carbon dioxide to dissipate from solution. In example 30 a spiral wound gasket containing a sealing layer formed from preparative example 3 was immersed in the cation solution for 1 hour, rinsed, dried and tested by immersion in water for 30 minutes.

Water resistance of a gasket sealing layer prevents the filler from softening and extruding from the gasket, which reduces the structural integrity of the gasket. In a control sample that was not subject to cation exchange, after 30 minutes immersion in water most of the filler had been extruded. However, in example 30 there was no visual extrusion of the filler.

6. 1 M Ammonium Citrate

Ammonium citrate was formed at 1 M concentration by slowly adding 58 g ammonium carbonate (from Sigma Aldrich) to 84 g of citric acid monohydrate in de-ionised water and making up to 400 ml . A 0.33 M solution was formed by halving these quantities in a total 600 ml solution. In both cases, the solutions were left for 24 hours before use to dissipate carbon dioxide.

In example 31, a spiral wound gasket containing a sealing layer formed from preparative example 3 was immersed in the 1 M concentration solution for 1 hour, rinsed, dried and tested by immersion in water for 30 minutes.

In example 32, a spiral wound gasket containing a sealing layer formed from preparative example 3 was immersed in the 0.33 M concentration solution for 1 hour, rinsed, dried and tested by immersion in water for 30 minutes.

The gaskets of both example 31 and example 32 imparted advantageous levels of waterproofing to the gaskets as there was no visual extrusion of the filler.

Leakage Testing

Modified SHELL gas leakage tests were performed on gaskets containing a treated sheet formed according to either preparative example 1 or preparative example 3 and using various cation solutions.

All the SHELL tests were carried out on 4" Class 300 gaskets (according to ANSI B16.5) having a wire of 316 L and containing the treated sheet.

The test rig had a welding neck flange with a raised face. The test volume of the rig was approx. 2.0 litres. The following materials were used:

Flanges: ASTM A 182 Gr. F11 or F12
Pipe: ASTM A 335 P11
Stud bolts: ASTM A 193 Gr. B16
Nuts: ASTM A 194 Gr. 4H.

The roughness of the flange facing was a smooth finish (Ra 3.2-6.3 µm). All sample gaskets were dried for 1 hour at 100° C. prior to testing.

To test the gaskets at ambient temperature, an initial bolt stress 290 MPa (i.e. 71 MPa on stressed area of kammprofile, 107 MPa on stressed area of spiral wound gasket with inner and outer rings) was applied and the internal pressure raised to 5.2 MPa. After a setting time of 30 minutes, the pressure was maintained for 1 hour, after which the internal pressure was recorded.

To test the gaskets at elevated temperature, an initial bolt stress 290 MPa (i.e. 71 MPa on stressed area of kammprofile, 107 MPa on stressed area of spiral-wound) was applied and the joint containing the test gasket was heated up at a rate of about 100° C./h up to 450° C. When the temperature had reached 450° C. the internal pressure was raised to around 3.4 MPa. The temperature was maintained for 1 hour, after which the internal pressure was recorded. The joint was then allowed to cool down to ambient temperature before the heating cycle was repeated.

The results of the SHELL tests are shown in table 7 below. No additional gas was applied during testing.

TABLE 7

Gas leakage Test Results

| | | | | | | SHELL Test Measurements (MPa) | | | | | |
|---|---|---|---|---|---|---|---|---|---|---|---|
| Gasket Type | Preparative example | Sheet type | Consolidated (y/n)? | Treatment | Immersion in Water | R.T. | Cycle 1 | Cycle 2 | Cycle 3 | Loss | Loss after 12 cycles |
| Spiral-wound gaskets with inner and outer guide rings | 3 | Comparative example 15 | Y | None | n/a | 5.21-5.21 | 3.39-3.37 | 3.35 | 3.32 | 0.07 | 0.27 |
| | 3 | Example 33 | Y | 1M Potassium Citrate/15 Min | n/a | 5.20-5.19 | 3.38-3.38 | 3.36 | 3.33 | 0.05 | 0.19 |
| | 3 | Example 34 | Y | 1M Potassium Citrate/15 Min | 30 Min | 5.20-5.20 | 3.38-3.37 | 3.35 | 3.33 | 0.05 | |
| | 3 | Example 35 | Y | 1M Sodium Citrate/15 Min | n/a | 5.20-5.20 | 3.39-3.38 | 3.36 | 3.34 | 0.05 | |
| | 3 | Example 36 | N | 1M Potassium Citrate/15 Min | n/a | 5.21-5.20 | 3.38-3.38 | 3.36 | 3.34 | 0.04 | |

TABLE 7-continued

Gas leakage Test Results

| Gasket Type | Preparative example | Sheet type | Consolidated (y/n)? | Treatment | Immersion in Water | SHELL Test Measurements (MPa) | | | | | Loss after 12 cycles |
|---|---|---|---|---|---|---|---|---|---|---|---|
| | | | | | | R.T. | Cycle 1 | Cycle 2 | Cycle 3 | Loss | |
| | 3 | Example 37 | N | 1M Ammonium Citrate/15 Min | n/a | 5.20-5.20 | 3.39-3.38 | 3.36 | 3.33 | 0.06 | |
| Kammprofile gaskets | 1 | Example 38 | N | 1M Potassium Citrate/60 Min | n/a | 5.17-5.17 | 3.39-3.38 | 3.37 | 3.36 | 0.03 | 0.05 |
| | 1 | Example 39 | N | 1M Potassium Citrate/15 Min | 30 Min | 5.20-5.20 | 3.40-3.39 | 3.38 | 3.37 | 0.03 | |

Table 7 shows that Spiral Wound Gaskets containing the treated sealing material perform better in gas leakage performance than the untreated sample whether consolidated or unconsolidated. The kammprofile gasket immersed for 15 min in potassium citrate performs as well as that immersed for 60 min. Accordingly, the waterproofing does not result in deleterious gas leakage performance.

As shown by the above examples, the use of various fillers, covering a wide range of particle sizes and specific surface areas, added to CEV in combination with a treatment of monovalent water resistance enhancing cations results in an enhancement of the water resistance of the combined filler and CEV materials.

Specifically, table 3 shows that in the untreated state, 100% CEV materials have better water resistance than filled but untreated CEV materials. In contrast, tables 4, 5, 6, and 7 show that treatment of the same materials as used in table 3 with a water resistance enhancing cation containing solution surprisingly results in the filled CEV material presenting better water resistance than the treated, and untreated, 100% CEV material.

Further, the examples show that a range of water resistance enhancing cations are suitable in the present invention.

Example 40-41 relate to TH894 rings (TH894 packing is an exfoliated vermiculite based packing available from Flexitallic—the product is reinforced with Inconel wire).
Method & Results Segments of TH894 packing were blocked into ¾ rings of 10 mm x-section and 45 mm diameter. Example 40 is a comparative example with no waterproofing treatment, Example 40 is subjected to 8 hours immersion in deionised water, and Example 41 is a sample treated with potassium citrate, by immersing the ¾ ring for 1 hour in 0.33 M solution, subsequently rinsing in tap water and then drying 2 hours at 50° C. which is then also subjected to 8 hours immersion in deionised water.

The samples immersed in water (Examples 40 and 41) were weighed prior to and after 8 hours immersion; example 40 gained 53.8% weight, due to water adsorption, while example 41 gained only 25.1%. The treated example 41 visibly swelled less than the untreated example 40, and did not feel as soft when removed from the water.

Example 42

A sample of TH894 was treated by coating on a saturated solution of potassium citrate (3 M) rinsing and drying as detailed for example 41. Testing was again carried out by immersing in deionised water for 8 hours; the swelling was intermediate between the untreated example 40 and the immersion treated example 41 and the weight gain, after water immersion, was 45.3%.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A water resistant sealing material comprising modified chemically exfoliated vermiculite (CEV) in a proportion of 30-70% w/w sealing material and a filler in a proportion of 30-70% w/w sealing material, wherein the modified CEV comprises water resistance enhancing monovalent cations comprising sodium, potassium, rubidium, cesium, francium, ammonium, or a quaternary ammonium compound of formula $R_4N^+$ wherein R is selected from methyl, ethyl or a combination thereof.

2. A water resistant sealing material according to claim 1, wherein the water resistance enhancing monovalent cations are exchangeable cations.

3. A water resistant sealing material according to claim 1, wherein the water resistance enhancing monovalent cations in the CEV are present at cation exchange sites in the CEV.

4. The water resistant sealing material according to claim 1, wherein the water resistance enhancing monovalent cations comprise at least one of sodium, potassium, and ammonium.

5. The water resistant sealing material according to claim 1, wherein the modified CEV is present in the sealing material in the range of 30-68% w/w of the sealing material.

6. The water resistant sealing material according to claim 1, wherein at least 1% of the exchangeable cations in the sealing material are waterproof enhancing monovalent cations.

7. The water resistant sealing material according to claim 1, wherein the modified CEV is at least 1% cation exchanged with water resistance enhancing monovalent cation.

8. The water resistant sealing material according to claim 1, wherein the filler comprises an inert filler.

9. The water resistant sealing material according to claim 8, wherein the inert filler comprises at least one of a plate-like filler or a particulate filler.

10. The water resistant sealing material according to claim 8, wherein the plate-like filler comprises at least one of talc, vermiculite, or mica.

11. A process of production of a sealing material comprising the steps of:
 a) mixing chemically exfoliated vermiculite (CEV) with a filler to form an intimate mixture thereof; and
 d) contacting the mixture of CEV and filler with a solution of a water resistance enhancing monovalent cation.

12. The process according to claim 11, wherein after mixing of the CEV and the filler, the intimate mixture of CEV and filler is formed into a sheet and the sheet is at least partially dried before the step of contacting the mixture with the solution of water resistance enhancing monovalent cation.

13. The process according to claim 11, wherein the concentration of the water resistance enhancing monovalent cation in the solution is in the range of 0.1-10 mol.dm$^{-3}$.

14. The process according to claim 11, wherein contacting the mixture of CEV and filler comprises immersing the mixture in the monovalent cation solution, wherein the solution has a concentration of 0.2-3.0 mol.dm$^{-3}$, for a period of between 5-180 minutes.

15. The process according to claim 11, wherein the solution of water resistance enhancing monovalent cation comprises a solution of a citrate salt or a chloride salt of the water resistance enhancing monovalent cation.

16. The process according to claim 11, further comprising the step of forming a sheet from the mixture of CEV and filler.

17. The process according to claim 12, further comprising the step of incorporating the partially dried sheet into an apparatus before the step of contacting the mixture with the solution of water resistance enhancing monovalent cation.

18. An apparatus comprising a sealing material, wherein the sealing material comprises modified chemically exfoliated vermiculite (CEV) in a proportion of 30-70% w/w sealing material, and filler in a proportion of 30-70% w/w sealing material, and wherein the modified CEV comprises water resistance enhancing monovalent cations at cation exchange sites, wherein the water resistance enhancing monovalent cations comprise sodium, potassium, rubidium, cesium, francium, ammonium, or a quaternary ammonium compound of formula $R_4N^+$ wherein R is selected from methyl, ethyl or a combination thereof.

19. The apparatus of claim 18, wherein the apparatus is a water-resistant gasket, wherein the water-resistant gasket comprises a solid support, and wherein the sealing material comprises a layer on the solid support.

20. The apparatus of claim 19, wherein the apparatus is a valve seal, and wherein the valve seal comprises a packing ring formed from the sealing material.

21. The apparatus of claim 20, wherein the valve seal comprises at least one packing ring formed from the sealing material and at least one packing ring formed from graphite.

* * * * *